United States Patent Office 3,485,914
Patented Dec. 23, 1969

3,485,914
PROCESS FOR THE PRODUCTION OF A PHARMACEUTICAL ANTIBIOTIC PREPARATION HAVING DELAYED THERAPEUTIC ACTION AND THE COMPOSITION PREPARED ACCORDING TO SUCH PROCESS
Murray E. Corn, Massapequa, N.Y., assignor to Chemical and Pharmaceutical Patent Holding Ltd., Zug, Switzerland
No Drawing. Filed July 5, 1966, Ser. No. 562,534
Int. Cl. A61k 21/00
U.S. Cl. 424—22          8 Claims

ABSTRACT OF THE DISCLOSURE

A pharmaceutical preparation having sustained activity and containing a granulate which includes a matrix of an admixture of an antibiotic, polyvinylpyrrolidone and shellac; and a coating on the matrix which is free of the antibiotic and consists of a mixture of the polyvinylpyrrolidone and shellac.

This invention relates to pharmaceutical compositions and to methods for their production.

More particularly, this invention is directed to antibiotic pharmaceutical preparations which have long-lasting pharmaceutical action.

Pharmaceutical preparations having long-lasting action have become more and more important during the last decade and are very desirable therapeutically. In many products the release of the active substance in the body is extremely irregular. On the one hand the rate of release of the active substance may be higher than desired so that substantially all the active ingredients are released and absorbed within a short interval incurring the possibility of over-dosage, while on the other hand the release rate may be too low or the dissolution rate insufficient, so that absorption is so low that important amounts of the active substances are eliminated, unchanged and unused.

If uniform levels of therapeutic action are desired, administration of the drug must be repeated often. To avoid such troublesome repetitions, incorporation of active ingredients in larger amounts and in less soluble forms for utilization in the body have been attempted; thereby the active ingredients are then delivered to the blood slowly in smaller doses over a longer period of time.

Pharmaceutical preparations which are administered orally should be able to maintain therapeutic concentrations over a longer period of time in the body fluids, preferably in the blood. These preparations should only be disintegrated partially in the gastric juices giving a fairly high initial blood level and then the remainder should dissolve slowly in the intestinal tract, thereby being absorbed in small useful doses over a longer period of time into the bloodstream.

The introduction of such long-acting medicaments has been achieved with penicillin. In this respect, for instance, procaine-penicillin has been produced, which is a compound that has relatively low solubility in water and therefore remains in the blood for a longer time, so that the number of administrations can be reduced. The forming of low solubility compounds with antibiotics other than penicillin is not known and therefore other means must be sought to furnish sustained release effect.

A similar sustained release effect can also be obtained with high solubility forms of penicillin by coating an orally administered solid preparation with different films. Such high solubility forms of penicillin are its sodium and potassium salts which have their own unique reaction properties.

This invention is not directed to compounding as known with penicillin and is not directed to enteric coatings which are used to inhibit the release of the highly soluble sodium and potassium salts of penicillin. The present invention is concerned with an entirely different phenomena by which antibiotic substances can be slow-released uniformly.

In order to obtain the same effect for a number of antibiotics, the known methods have not always proved successful or satisfactory.

An object of the invention is to provide pharmaceutical preparations containing an active antibiotic substance which will have relatively slow release into the body tissues and at a substantially constant rate.

The present invention is characterized in that the antibiotic active ingredient is mixed with a solution of alcoholic polyvinylpyrrolidone and arsenic-free shellac and is then granulated, whereafter the granules thus obtained are covered with a coating which is free of active ingredient. The granules are comprised of a core and a plurality of spherical layers in which the concentration of the antibiotic substance in the core is greater than that in the layers.

The finished preparation is characterized in that it consists of a matrix formed of the active antibiotic ingredient, polyvinylpyrrolidone and shellac, the matrix being covered with a coating free of active ingredient.

The components of the matrix are present in a weight relationship of active antibiotic ingredient: polyvinylpyrrolidone: shellac of about 10:0.9–1.2:0.4–0.6.

The chemical stability of the above matrix is such that the absorption rate of the active ingredient into the body fluids is relatively constant.

During the disintegration of the matrix over a sustained period of time, the active ingredient is gradually released throughout the entire gastro-intestinal tract. This has the advantage that nowhere in the gastro-intestinal tract will there be high concentrations of the active ingredient, as is the case with conventional orally administered antibiotics. This is of paramount importance regarding the intestinal flora, since it is known that all antibiotics can be harmful to the intestinal flora.

For this reason antibiotics are frequently administered by intra-muscular injections (i.e., administration outside of the gastro-intestinal tract).

However, this method has its limits. For instance, in underdeveloped countries, oral administration remains the only practical method. However, in these areas the patient will often only take the oral administration in a hospital or clinic and has been known to throw away the medication when the dose must be repeated every 4–6 hours. Therefore, the preparation according to the invention insures greater therapeutic control by virtue of the greater intervals between administrations, for example, every 12 hours only.

According to the invention, the preparation which is produced constantly releases the active ingredient throughout the entire gastro-intestinal tract at a relatively slow rate, therefore nowhere in the gastro-intestinal tract are there high concentrations of the active antibiotic ingredient. The active ingredient is released and is slowly absorbed during a period of 8 or more hours.

Thereby the following advantages are obtained:

(a) A single-dose sustained-release effect never achieved before with antibiotics is obtained;

(b) The intestinal flora remains intact and substantially unharmed, because the local concentrations in the intestines are very low. The preparation is somewhat resistant to the gastric juices and leaves the stomach after being only partially absorbed therein, the major portion being absorbed in the intestines. Since the active ingredient is an antibiotic, it is of advantage that it is not released in the intestines in too high concentrations, because of its harmful effect on the intestinal flora.

The preparation consists of two parts, one being a matrix containing the active ingredient, the other being a coating or film which is free of active ingredient. In the matrix the active ingredient is mixed with polyvinylpyrrolidone and arsenic-free pharmaceutical shellac whereby a matrix of active ingredient and polyvinylpyrrolidone complex is formed.

This matrix is covered in a coating pan with a film consisting of polyvinylpyrrolidone and shellac, i.e., a film which is free of active ingredient. This coating has the effect that the granules do not disintegrate in the stomach too quickly so that there is only partial disintegration in the stomach, and complete disintegration takes place only after the granules subsequently reach the intestinal tract. Since the matrix as well as the coating contain polyvinylpyrrolidone-shellac, a relatively slow and uniform disintegration of the active antibiotic ingredients throughout the entire gastro-intestinal tract is obtained.

The consequence thereof is that the blood level can be kept on a therapeutically active level for a period of up to 12 hours so that instead of administering the normal doses every four to six hours, it now is sufficient to administer the same doses every twelve hours, and reach and retain a therapeutically effective blood level.

Antibiotics which have proved to be especially suitable for the inventive preparation are: Tetracycline, its derivatives and its salts: tetracycline, oxytetracycline, chlorotetracycline, dimethyltetracycline, their hydrochlorides, their salts and their amino-methyl compounds;

Chloramphenicol (chloromycin), its derivatives and its salts;

Endomycin, its derivatives and its salts;
Streptomycin, its derivatives and its salts;
Oleandomycin, its derivatives and its salts;
Erythromycin, its derivatives and its salts;
Kanamycin, its derivatives and its salts.

The following examples serve to illustrate the preparation of the granules and the dosage form:

EXAMPLE I

The following mixture is prepared:

|   | G. |
|---|---|
| Chloramphenicol | 1,000 |
| An infusorial earth substance such as Syloid | 5 |
| Talc | 5 |
| Total | 1,010 |

The following solution is prepared:

20% polyvinylpyrrolidone in isopropyl alcohol, w./w.
40% refined shellac in isopropyl alcohol, w./w.

The above powder mixture is granulated with a mixture consisting of 270 ml. of the 20% polyvinylpyrrolidone solution and 130 ml. of the 40% shellac solution. It is then passed wet through a 20-mesh sieve.

The granulation product is dried at a temperature between 30–40° C. in vacuum. The dried granules are then sieved using 16 and 50-mesh sieves. The resulting granules between 16 and 50 mesh have a yield of 60–75%.

The dry granules are placed in a rotating coating pan and are wetted at regular intervals in the rotating coating pan with a solution consisting of 85 parts of 20% polyvinylpyrrolidone solution and 15 parts of 40% shellac solution, until 1000 ml. total have been used.

The following mixture is prepared:

|   | G. |
|---|---|
| Chloramphenicol | 1500 |
| Syloid | 75 |
| Total | 1575 |

This mixture is applied in small portions to the wetted granules at intervals until the entire amount has been consumed.

After each application, the granules are dried, for example, with hot air which is introduced into the pan.

During this phase of the operation no talc is used, as it would make the granules too heavy.

The granules thus produced are sieved between 20 and 40 mesh, and are vacuum dried at 30° C.

The parts which have been retained on the 20 or passed through the 40-mesh sieves are completely recycled in a next batch.

The granules thus produced are finally covered with a coating containing no active ingredient.

The coating may consist, for example, of 300 ml. of a solution containing one part 20% polyvinylpyrrolidone and 9 parts 40% shellac applied in 6 to 9 applications.

The granules are dried through hot air in the pan, so that no special drying is necessary.

1 g. of the granulate contains between 550–700 mg. of chloramphenicol.

The above process has been carried out with other antibiotic substances listed below:

Tetracycline, its derivatives and its salts: tetracycline, oxytetracycline, chlorotetracycline, dimethyltetracycline, their hydrochlorides, their salts and their amino-methyl compounds;

Endomycin, its derivatives and its salts;
Streptomycin, its derivatives and its salts;
Oleandomycin, its derivatives and its salts;
Erythromycin, its derivatives and its salts;
Kanamycin, its derivatives and its salts.

The granules have been tested with animals to determine the release rate of the active anti-biotic substance. This has been effected by measuring the quantity of active ingredient in the blood serum of the animals over a 12 hour period of time. Moreover, this has been compared with blood serum levels of animals in which the active ingredient is supplied in conventional form. The results are shown in the following table, where the active ingredient is tetracycline hydrochloride. Therefrom it will become apparent that the oral composition of the present application supplies active ingredient for a 12 hour period, whereas the conventional ingredient is no longer present in the blood serum after 6 hours.

MICROGRAMS/ML. TETRACYCLINE FOUND IN THE BLOOD SERUM OF DOGS

| Comparative test with ordinary tetracycline hydrochloride (oral administration) 10/65 of 250 mg./capsule | | | Test with the preparation of tetracycline-hydrochloride 10/65 of 250 mg./capsule | | | | |
|---|---|---|---|---|---|---|---|
| Hours after administration | Group 1 | Group 2 | Hours after administration | Group 3 | Group 4 | Group 5 | Group 6 |
| 0 | 0 | 0 | 0 | 0.000 | 0.000 | 0.000 | 0.000 |
| 2 | 0.210 | 0.236 | 2 | 0.228 | 0.234 | 0.291 | 0.276 |
| 3 | 0.236 | 0.200 | 3 | 0.183 | 0.330 | 0.309 | 0.312 |
| 4 | 0.150 | 0.200 | 4 | 0.243 | 0.273 | 0.243 | 0.312 |
| 6 | 0.150 | 0.159 | 6 | 0.259 | 0.171 | 0.291 | 0.291 |
| 8 | 0.000 | 0.000 | 8 | 0.192 | 0.192 | 0.192 | 0.192 |
| 10 | 0.000 | 0.000 | 10 | 0.192 | 0.216 | 0.216 | 0.216 |
| 12 | 0.000 | 0.000 | 12 | 0.171 | 0.228 | 0.192 | 0.192 |

Numerous modifications and variations of the disclosed invention will now become apparent to those skilled in the art without departing from the scope and spirit of the invention as defined in the appended claims.

What is claimed is:

1. A pharmaceutical preparation for oral administration, comprising a granulate including a matrix consisting essentially of an intimate admixture of an antibiotic substance, polyvinylpyrrolidone and shellac, and a coating on said matrix which is free of antibiotic substance, said coating being a mixture of polyvinylpyrrolidone and arsenic-free shellac.

2. A preparation as claimed in claim 1, wherein the weight ratio of antibiotic substance, polyvinylpyrrolidone and shellac, is approximately 10:0.9–1.2:0.4–0.6.

3. A preparation according to claim 1, wherein said matrix consists of a filler selected from the group consisting of a talc, a silicate of a low bulk density, and mixtures thereof.

4. A preparation according to claim 1, wherein said antibiotic substance is chloromycine; tetracycline and its derivatives: oxytetracycline, chlorotetracycline, dimethyltetracycline and their amino-methyl derivatives and their salts; streptomycin, its derivatives and its salts; endomycin, its derivatives and its salts; oleandomycin, its derivatives and its salts; erythromycin, its derivatives and its salts; or kanamycin, its derivatives and its salts.

5. A preparation according to claim 1, wherein each gram of granulate contains between 550 and 700 mg. of active ingredient.

6. A pharmaceutical article in unit dosage form for oral administration, comprising a plurality of granules each consisting essentially of a matrix comprising polyvinylpyrrolidone, shellac and an antibiotic substance, a coating on said matrix free of the antibiotic substance and comprising polyvinylpyrrolidone and shellac.

7. An article according to claim 6, wherein the weight ratio of antibiotic substance, polyvinylpyrrolidone and shellac, is approximately 10:0.9–1.2:0.4–0.6.

8. An article according to claim 6, wherein the antibiotic substance is chloromycine; tetracycline and its derivatives: oxytetracycline, chlorotetracycline, dimethyltetracycline and their amino-methyl derivatives and their salts; streptomycin, its derivatives and its salts; endomycin, its derivatives and its salts; oleandomycin, its derivatives and its salts; erythromycin, its derivatives and its salts; or kanamycin, its derivatives and its salts.

References Cited

UNITED STATES PATENTS

| | | | |
|---|---|---|---|
| 2,809,916 | 10/1957 | Hermelin | 167—82 |
| 2,928,770 | 3/1960 | Bardoni | 167—82 |
| 2,953,497 | 9/1960 | Press | 167—82 |
| 2,954,322 | 9/1960 | Heilig et al. | 167—82 |
| 2,991,226 | 7/1961 | Millar et al. | 167—82 |

S. K. ROSE, Primary Examiner